(12) United States Patent
Izukawa et al.

(10) Patent No.: US 9,709,878 B2
(45) Date of Patent: Jul. 18, 2017

(54) PROJECTOR AND REAR PROJECTOR

(71) Applicant: Funai Electric Co., Ltd., Daito-shi, Osaka (JP)

(72) Inventors: Shintaro Izukawa, Daito (JP); Ken Nishioka, Daito (JP); Atsuhiko Chikaoka, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 543 days.

(21) Appl. No.: 14/174,152

(22) Filed: Feb. 6, 2014

(65) Prior Publication Data

US 2014/0240681 A1 Aug. 28, 2014

(30) Foreign Application Priority Data

Feb. 22, 2013 (JP) ................. 2013-032904

(51) Int. Cl.
*G06F 3/042* (2006.01)
*G03B 21/14* (2006.01)
*H04N 9/31* (2006.01)

(52) U.S. Cl.
CPC ......... *G03B 21/142* (2013.01); *G06F 3/0423* (2013.01); *H04N 9/3129* (2013.01); *H04N 9/3194* (2013.01)

(58) Field of Classification Search
CPC .... G06F 3/03547; G06F 3/0412; G06F 3/042; G06F 3/0421; G06F 3/0423; G06F 3/03542; G03B 21/56; H04N 5/74; H04N 9/31
USPC ....... 345/173, 174, 175, 179, 180, 181, 182, 345/183
See application file for complete search history.

(56) References Cited

U.S. PATENT DOCUMENTS

| | | |
|---|---|---|
| 6,674,424 B1 | 1/2004 | Fujioka |
| 6,829,372 B2 | 12/2004 | Fujioka |
| 7,342,574 B1 | 3/2008 | Fujioka |
| 7,379,622 B2 | 5/2008 | Fujioka |
| 7,959,303 B2 * | 6/2011 | Nishioka .............. H04N 9/3155 250/370.15 |
| 8,113,953 B2 | 2/2012 | Ohba et al. |
| 8,123,361 B2 * | 2/2012 | Nagashima ........... G06F 3/0423 353/30 |
| 8,358,872 B2 | 1/2013 | Fujioka |
| 8,373,678 B2 | 2/2013 | Yamada |
| 8,690,337 B2 * | 4/2014 | Nishigaki ............. G06F 3/0423 345/30 |

(Continued)

FOREIGN PATENT DOCUMENTS

| | | |
|---|---|---|
| JP | 10-78844 A | 3/1998 |
| JP | 2001-125745 A | 5/2001 |

(Continued)

OTHER PUBLICATIONS

European Search Report dated Jun. 6, 2014 {Six (6) pages}.

*Primary Examiner* — William C Dowling
(74) *Attorney, Agent, or Firm* — Crowell & Moring LLP

(57) ABSTRACT

This projector includes a laser beam generation portion, an image projection portion including a scanning portion and projecting an image on a projection area, a beam receiving portion receiving the laser beam reflected by a detection object and a control portion detecting an operation performed on the projected image with the detection object on the basis of the moving state of the detection object.

19 Claims, 12 Drawing Sheets

(56) References Cited

U.S. PATENT DOCUMENTS

| | | | |
|---|---|---|---|
| 8,941,620 B2* | 1/2015 | Sze | G06F 3/0425 345/175 |
| 2005/0140832 A1 | 6/2005 | Goldman et al. | |
| 2008/0088587 A1* | 4/2008 | Pryor | H04N 9/3129 345/158 |
| 2009/0091553 A1 | 4/2009 | Keam et al. | |
| 2009/0128716 A1* | 5/2009 | Nagashima | G06F 3/0423 348/756 |
| 2012/0032875 A1* | 2/2012 | Sprowl | G02B 27/01 345/156 |
| 2012/0327031 A1 | 12/2012 | Fujioka | |
| 2013/0070232 A1* | 3/2013 | Izukawa | G06F 3/0304 356/51 |
| 2013/0127716 A1* | 5/2013 | Nagashima | H04N 9/3129 345/158 |
| 2013/0127717 A1* | 5/2013 | Nagashima | G06F 3/0423 345/158 |
| 2015/0116276 A1* | 4/2015 | Izukawa | G06F 3/0423 345/175 |

FOREIGN PATENT DOCUMENTS

| | | |
|---|---|---|
| JP | 2001-184161 A | 7/2001 |
| JP | 2008-12102 A | 1/2008 |
| JP | 2009-258569 A | 11/2009 |
| JP | 2010-243576 A | 10/2010 |

* cited by examiner

FIG.3 TOUCH DETECTION PROCESSING BASED ON STOPPING (FIRST EMBODIMENT)
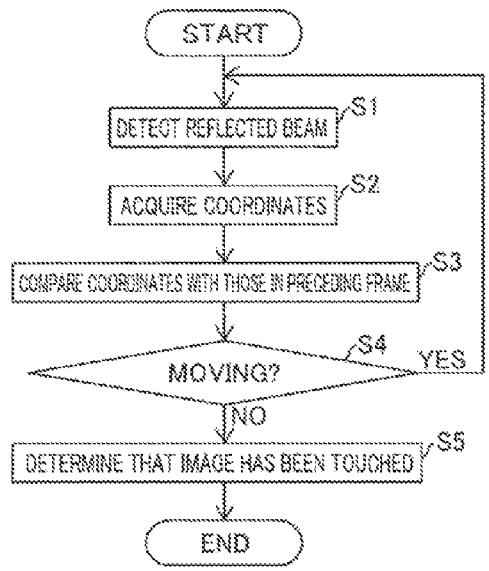
FIG.4
TOUCH DETECTION PROCESSING BASED ON STOPPING (FIRST EMBODIMENT)
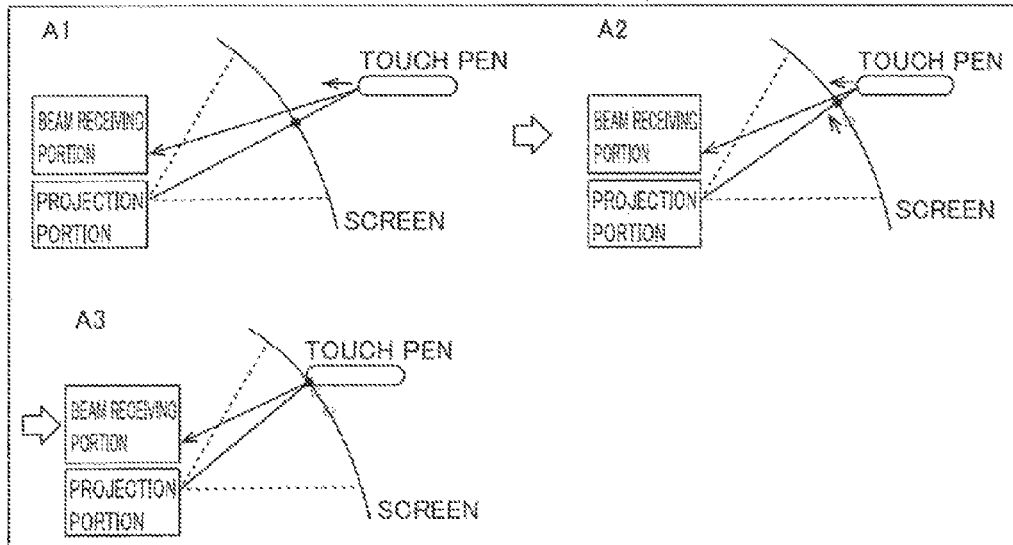
FIG.5
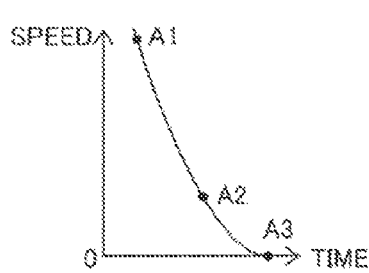

MODIFICATION

PROJECTOR AND REAR PROJECTOR

BACKGROUND OF THE INVENTION

Field of the Invention

The present invention relates to a projector and a rear projector, and more particularly, it relates to a projector and a rear projector each including a laser beam generation portion.

Description of the Background Art

A projector including a laser beam generation portion is known in general, as disclosed in Japanese Patent. Laying-Open No. 2009-258569, for example.

The aforementioned Japanese Patent Laying-Open No, 2009-258569 discloses a projector module (projector) including a laser diode outputting a laser beam, a projector scanning means scanning the laser beam and projecting an image on a projection area, a beam sensing means receiving the laser beam reflected by a measurement object and a control means detecting that the measurement object has touched the projected image such as a button when the beam sensing means receives the laser beam.

In the projector module (projector) according to the aforementioned Japanese Patent Laying-Open No. 2009-258569, however, the control means is configured to detect that the measurement object has touched the projected image when the beam sensing means receives the laser beam, and hence the same may disadvantageously detect the touch operation of the measurement object on a false position if the beam sensing means receives the laser beam reflected by the measurement object on a position other than a touch position while the measurement object approaches the touch position of the projected image such as a button. Therefore, the control portion may not precisely detect the touch operation of the measurement object.

SUMMARY OF THE INVENTION

The present invention has been proposed in order to solve the aforementioned problem, and an object of the present invention is to provide a projector and a rear projector each capable of precisely detecting an operation performed on a projected image with a detection object.

A projector according to a first aspect of the present invention includes a laser beam generation portion outputting a laser beam, an image projection portion including a scanning portion scanning the laser beam and projecting an image on a projection area, a beam receiving portion receiving the laser beam reflected by a detection object and a control portion acquiring a moving state of the detection object from a receptive result of the laser beam received by the beam receiving portion and detecting an operation performed on the projected image with the detection object on the basis of the moving state of the detection object.

As hereinabove described, the projector according to the first aspect of the present invention is provided with the control portion acquiring the moving state of the detection object from the receptive result of the laser beam received by the beam receiving portion and detecting the operation performed on the projected image with the detection object on the basis of the moving state of the detection object so that the same can detect the operation performed with the detection object in consideration of moving states of the detection object before and after the operation performed therewith, whereby the control portion can be inhibited from detecting the operation performed with the detection object on a false position when the reflected laser beam is received while the detection object approaches an operating position. Thus, the control portion can precisely detect the operation such as a touch operation performed on the projected image with the detection object.

In the aforementioned projector according to the first aspect, the control portion is preferably configured to detect the operation performed on the projected image with the detection object on the basis of change in the moving state of the detection object acquired from the receptive result of the laser beam received by the beam receiving portion. According to this structure, the control portion can detect the operation performed on the projected image with the detection object on the basis of the change in the moving state of the detection object whose moving speed or direction changes before and after the operation, whereby the same can easily precisely detect the operation performed with the detection object.

In the aforementioned structure of detecting the operation performed on the projected image with the detection object on the basis of the change in the moving state of the detection object, the control portion is preferably configured to determine that the operation with the detection object has been performed on a position of the projected image corresponding to a position where movement of the detection object has stopped when determining that the movement of the detection object has stopped on the basis of the change in the moving state of the detection object acquired from the receptive result of the laser beam received by the beam receiving portion. According to this structure, the control portion can detect the operation when the detection object has stopped on the operating position without detecting the operation in the process of the movement of the detection object to the operating position, whereby the same can be easily inhibited from detecting the operation performed with the detection object on a false position in the process of the movement thereof.

In the aforementioned structure of detecting the operation performed on the projected image with the detection object on the basis of the change in the moving state of the detection object, the control portion is preferably configured to calculate a moving speed of the detection object from the receptive result of the laser beam received by the beam receiving portion, to acquire the change in the moving state of the detection object on the basis of change in the moving speed of the detection object, and to determine that the operation with the detection object has been performed on a position of the projected image corresponding to a position where movement of the detection object has stopped when the movement of the detection object has stopped. According to this structure, the control portion can easily determine that the movement of the detection object has stopped on the basis of the moving speed thereof, whereby the same can more easily precisely detect the operation performed with the detection object.

In the aforementioned structure of determining that the operation with the detection object has been performed on the position of the projected image corresponding to the position where the movement of the detection object has stopped, the control portion is preferably configured to determine that the detection object stands still when the position of the detection object with respect to the projected image remains unchanged in a prescribed range for at least a prescribed time. According to this structure, the control portion can recognize that the detection object has been stopped for the operation while allowing an error, whereby the same can detect the operation performed with the detection object to accord with the user's operational intention.

In the aforementioned structure of detecting the operation performed on the projected image with the detection object on the basis of the change in the moving state of the detection object, the control portion is preferably configured to acquire a scanning position of the laser beam scanned by the scanning portion at a timing of receiving the laser beam reflected by the detection object, to detect a position of the detection object with respect to the projected image and to detect movement of the detection object on the basis of change in the scanning position of the laser beam at the timing of receiving the laser beam reflected by the detection object. According to this structure, the control portion can easily detect the movement of the detection object by easily acquiring the position thereof.

In the aforementioned structure of detecting the operation performed on the projected image with the detection object on the basis of the change in the moving state of the detection object, the control portion is preferably configured to acquire the change in the moving state of the detection object on the basis of change in the quantity of the laser bean received by the bean receiving portion and to determine that the operation with the detection object has been performed when the change in the quantity of the received laser beam has stopped in a case where the quantity of the received laser beam has increased and the change in the quantity of the received laser beam has stopped. According to this structure, the control portion can easily determine that the movement of the detection object has stopped on the basis of that the change in the quantity of the received laser beam has stopped, whereby the same can more easily precisely detect the operation performed with the detection object.

In the aforementioned structure of detecting the operation performed on the projected image with the detection object on the basis of the change in the moving state of the detection object, the control portion is preferably configured to determine that the operation with the detection object has been performed on a position of the projected image corresponding to a position where the detection object has started moving in a second direction when detecting that the detection object has moved in a first direction, stopped and started moving in the second direction opposite to the first direction on the basis of the change in the moving state of the detection object acquired from the receptive result of the laser beam received by the beam receiving portion. According to this structure, the control portion can detect the operation performed on the projected image with the detection object on the basis of a series of moving states of the detection object approaching the projected image by moving in the first direction, stopping and separating from the projected image by moving in the second direction opposite to the first direction, whereby the same can be inhibited from detecting the operation performed with the detection object on a temporarily stopped position when the detection object has temporarily stopped and started moving to the operating position again in the process of moving toward the operating position, for example. Thus, the control portion can more precisely detect the operation performed with the detection object.

In the aforementioned, structure of detecting the operation performed on the projected image with the detection object on the basis of the change in the moving state of the detection object, the control portion is preferably configured to calculate a moving speed of the detection object from the receptive result of the laser beam received by the beam receiving portion, to acquire the change in the moving state of de detection object on the basis of change in the moving speed of the detection object, and to determine that the operation with the detection object has been performed on a position of the projected image corresponding to a position where the detection object has started moving in a second direction when detecting that the detection object has moved in a first direction, stopped and started moving in the second direction opposite to the first direction. According to this structure, the control portion can easily determine that the detection object has moved in the first direction, stopped and started moving in the second direction opposite to the first direction on the basis of the moving speed of the detection object, whereby the same can more easily precisely detect the operation performed with the detection object.

In the aforementioned structure of determining that the operation with the detection object has been performed on the position of the projected image corresponding to the position where the detection object has started moving in the second direction, the first direction is preferably a direction approaching the projected image, and the second direction is preferably a direction separating from the projected image. According to this structure, the control portion can precisely detect the touch operation performed with the detection object by detecting that the detection object has approached the projected image for the purpose of the operation and separating from the projected image after termination of the operation.

In the aforementioned structure of detecting the operation performed on the projected image with the detection object on the basis of the change in the moving state of the detection object, the control portion is preferably configured to acquire the change in the moving state of the detection object on the basis of change in the quantity of the laser beam received by the beam receiving portion and to determine that the operation with the detection object has been performed when the quantity of the received laser beam has started decreasing in a case where the quantity of the received laser beam has increased, the change in the quantity of the received laser beam has stopped and the quantity of the received laser beam has started decreasing. According to this structure, the control portion can easily determine that the detection object has moved in the first direction, stopped and started moving in the second direction opposite to the first direction on the basis of that the quantity of the received laser beam has increased, the change in the quantity of the received laser beam has stopped and the quantity of the received laser beam has started decreasing, whereby the same can more easily precisely detect the operation performed with the detection object.

In the aforementioned projector according to the first aspect, the control portion is preferably configured to determine that the operation with the detection object has been performed on a position of the projected image corresponding to a position where the detection object has stopped when detecting that the detection object has continuously moved in a third direction and stopped from the receptive result of the laser beam received by the beam receiving portion. According to this structure, the control portion determines that the operation with the detection object has been performed when the detection object has continuously moved in the third direction and stopped, whereby the same can be easily inhibited from detecting the operation performed with the detection object on a false position in the process of the movement thereof.

In this case, the third direction is preferably a direction approaching the projected image. According to this structure, the control portion can precisely detect the touch operation performed with the detection object by detecting that the detection object has approached the projected image for the purpose of the operation.

In the aforementioned projector according to the first aspect, the image projection portion preferably includes a rear projection type image projection portion projecting the image from behind the projection area. According to this structure, the control portion can be inhibited from detecting the operation performed with the detection object on a false position in the process of the movement thereof for precisely detecting the operation performed with the detection object also in a case where a laser beam reflected on a position separating from a projection area is easily detected in such a rear projector that a detection object is arranged on a side of the projection area opposite to a side where the laser beam is applied.

In the aforementioned projector according to the first aspect, the control portion is preferably configured to detect a tough operation performed on the projected image with the detection object on the basis of the moving state of the detection object. According to this structure, the control portion can precisely detect the touch operation performed with the detection object.

A rear projector according to a second aspect of the present invention includes a laser beam generation portion outputting a laser beam, an image projection portion including a scanning portion scanning the laser beam and projecting an image from behind a projection area, a beam receiving portion receiving the laser beam reflected by a detection object and a control portion acquiring a moving state of the detection object from a receptive result of the laser beam received by the beam receiving portion and detecting an operation performed on the projected image with the detection object on the basis of the moving state of the detection object.

As hereinabove described, the rear projector according to the second aspect of the present invention is provided with the control portion acquiring the moving state of the detection object from the receptive result of the laser beam received by the beam receiving portion and detecting the operation performed on the projected image with the detection object on the basis of the moving state of the detection object so that the same can detect the operation performed with the detection object in consideration of moving states of the detection object before and after the operation performed therewith, whereby the control portion can be inhibited from detecting the operation performed with the detection object on a false position when the reflected laser beam is received while the detection object approaches an operating position. Thus, a rear projector capable of precisely detecting an operation such as a touch operation performed on a projected image with a detection object can be provided.

In the aforementioned. rear projector according to the second aspect, the control portion is preferably configured to detect the operation performed on the projected image with the detection object on the basis of change in the moving state of the detection object acquired from the receptive result of the laser beam received by the beam receiving portion. According to this structure, the control portion can detect the operation performed on the projected image with the detection object on the basis of the change in the moving state of the detection object whose moving speed or direction changes before and after the operation, whereby the same can easily precisely detect the operation performed with the detection object.

In the aforementioned rear projector having the structure of detecting the operation performed on the projected image with the detection object on the basis of the change in the moving state of the detection object, the control portion is preferably configured to determine that the operation with the detection object has been performed on a position of the projected image corresponding to a position where movement of the detection object has stopped when determining that the movement of the detection object has stopped on the basis of the change in the moving state of the detection object acquired from the receptive result of the laser beam received by the beam receiving portion. According to this structure, the control portion can detect the operation when the detection object has stopped on the operating position without detecting the operation in the process of the movement of the detection object to the operating position, whereby the same can be easily inhibited from detecting the operation performed with the detection object on a false position in the process of the movement thereof.

In the aforementioned rear projector having the structure of detecting the operation performed on the projected image with the detection object on the basis of the change in the moving state of the detection object, the control portion is preferably configured to calculate a moving speed of the detection object from the receptive result of the laser beam received by the beam receiving portion, to acquire the change in the moving state of the detection object on the basis of change in the moving speed of the detection object, and to determine that the operation with the detection object has been performed on a position of the projected image corresponding to a position where movement of the detection object has stopped when the movement of the detection object has stopped. According to this structure, the control portion can easily determine that the movement of the detection object has stopped on the basis of the moving speed thereof, whereby the same can more easily precisely detect the operation performed with the detection object.

In the aforementioned rear projector having the structure of detecting the operation performed on the projected image with the detection object on the basis of the change in the moving state of the detection object, the control portion is preferably configured to acquire the change in the moving state of the detection object on the basis of change in the quantity of the laser beam received by the beam receiving portion and to determine that the operation with the detection object has been performed when the change in the quantity of the received laser beam has stopped in a case where the quantity of the received laser beam has increased and the change in the quantity of the received laser beam has stopped. According to this structure, the control portion can easily determine that the movement of the detection object has stopped on the basis of that the change in the quantity of the received laser beam has stopped, whereby the same can more easily precisely detect the operation performed with the detection object.

According to the present invention, as hereinabove described, the control portion can precisely detect the operation performed on the projected image with the detection object.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a flow chart for illustrating touch detection processing performed by a main CPU of the projector according to the first embodiment of the present invention on the basis of stopping of a touch pen;

FIG. 4 is a diagram for illustrating movement of the touch pen for operating an image in the projector according to the first embodiment of the present invention;

FIG. 5 is a graph showing the relation between a moving speed of the touch pen for operating the image in the projector according to the first embodiment of the present invention and time;

DESCRIPTION OF THE PREFERRED EMBODIMENTS

Embodiments of the present invention are now described with reference to the drawings.

(First Embodiment)

The structure of a projector 100 according to a first embodiment of the present invention is described with reference to FIGS. 1 and 2.

Figure 1:
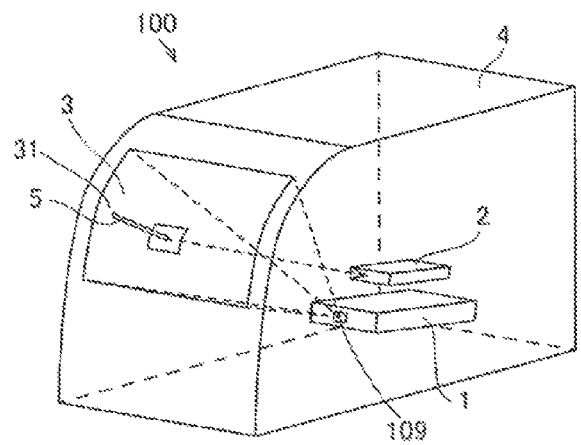
FIG. 1 is a schematic diagram showing a used state of a projector according to a first embodiment of the present invention.

The projector 100 according to the first embodiment of the present invention includes a projector body 1, a beam receiving portion 2, a screen 3 and a case 4, as shown in FIG. 1. This projector 100 is a rear projection type projector (rear projector) projecting an image 31 from behind the screen 3. The projector 100 is configured to accept an operation performed on the image 31 with an operating element such as a touch pen 5. The screen 3 is an example of the "projection area" in the present invention, and the touch pen 5 is an example of the "detection object" in the present invention.

Figure 2:
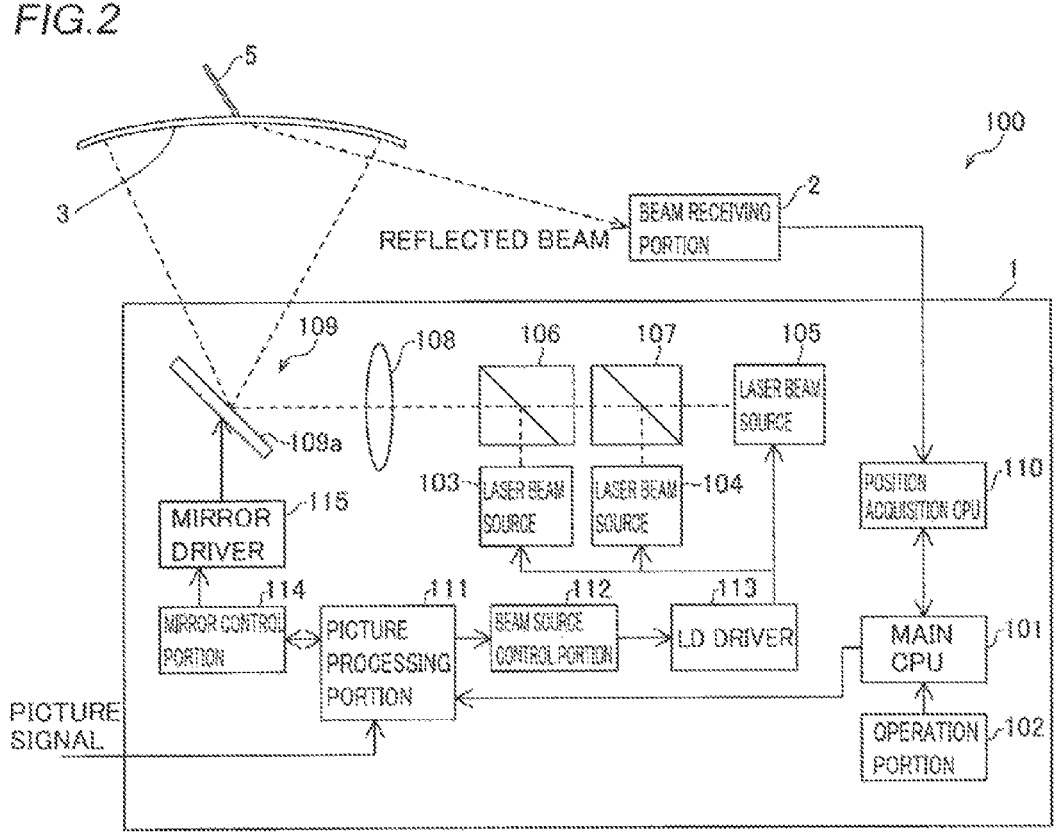
FIG. 2 is a block diagram showing the structure of the projector according to the first embodiment of the present invention.

The projector body 1 includes a main CPU 101, an operation portion 102, three laser beam sources 103, 104 and 105, two polarizing beam splitters 106 and 107, a lens 108, an imago projection portion 109, a position acquisition CPU 110, a picture processing portion 111, a beam source control portion 112, an LD (Laser Diode) driver 113, a mirror control portion 114 and a mirror driver 115, as shown in FIG. 2. The image projection portion 109 has an MEMS (Micro Electro Mechanical System) mirror 109a. The main CPU 101 is an example of the "control portion" in the present invention. The laser beam sources 103 to 105 are examples of the "laser beam generation portion" in the present invention, and the MEMS mirror 109a is an example of the "scanning portion" in the present invention.

The beam receiving portion 2 is configured to receive (detect) laser beams reflected by the touch pen 5, as shown in FIG. 2. The beam receiving portion 2 is connected to the position acquisition CPU 110, and configured to transmit beam receiving information indicating that the same has received the laser beams to the position acquisition CPU 110.

The screen 3 is configured to transmit and diffuse the laser beams projected by the projector body 1 from behind (from the side of the projector body 1) frontward (toward the side of the touch pen 5). More specifically, the screen 3 includes a plurality of diffusion lenses for diffusing the laser beams. The screen 3 is mainly made of resin such as vinyl chloride, and configured to be semitransparent for transmitting the laser beams. The screen 3 is in the form of a curved surface in conformity to a curved surface of the case 4.

The case 4 is provided to cover the projector body 1 and the beam receiving portion 2. The screen 3 is arranged on a front side of the case 4.

The main CPU 101 is configured to control the respective portions of the projector 100. The operation portion 102 is provided for accepting an operation of turning on the projector 100, an operation of changing the resolution of the image 31 and the like. The laser beam source 103 is configured to apply a blue laser beam to the MEMS mirror 109a through the polarizing beam splitter 106 and the lens 108. The laser beam sources 104 and 105 are configured to apply green and red laser beams to the MEMS mirror 109a through the beam splitters 107 and 106 and the lens 108 respectively.

The image projection portion 109 is configured to project the image 31 (see FIG. 1) on the screen 3. This image projection portion 109 is a rear projection type image projection portion projecting the image 31 from behind the screen 3. More specifically, the image projection portion 109 is so configured that the MEMS mirror 109a thereof scans the laser beams applied from the laser beam sources 103 to 105 and projects the image 31 from behind. the screen 3 (from inside the case 4). The MEMS mirror 109a is configured to scan the laser beams along two axes in the horizontal direction and the vertical direction. Further, the MEMS mirror 109a is configured to scan the horizontal direction at a high speed by resonance driving and to scan the vertical direction at a low speed by DC driving.

The position acquisition CPU 110 is configured to acquire the position of the touch pen 5 on the basis of time information as to the time when the beam receiving portion 2 has received the reflected laser beams and scanning loci of the laser beams. More specifically, the position acquisition CPU 110 acquires the position (coordinates) of the touch pen 5 corresponding to the image 31 by specifying positions of the detected laser beams scanned with respect to the image 31 on the basis of an elapsed time up to the detection of the laser beams from horizontal synchronizing signals and the scanning loci of the laser beams.

The picture processing portion 111 is configured to control projection of a picture on the basis of an externally received picture signal. More specifically, the picture processing portion 111 is configured to control driving of the MEMS mirror 109a through the mirror control portion 114 and to control the application of the laser beams by the laser beam sources 103 to 105 through the beam source control portion 112 on the basis of the externally received picture signal.

The beam source control portion 112 is configured to control the application of the laser beams by the laser beam sources 103 to 105 by controlling the LD driver 113 on the basis of the control by the picture processing portion 111. More specifically, the beam source control portion 112 is configured to perform control of making the laser beam. sources 103 to 105 apply the laser beams of colors corresponding to respective pixels of the image 31 in timing with the scanning of the MEMS mirror 109a.

The mirror control, portion 114 is configured to control driving of the MEMS mirror 109a by controlling the mirror driver 115 on the basis of the control by the picture processing portion 111.

According to the first embodiment, the main CPU 101 is configured to acquire a moving state of the touch pen 5 from receptive results of the laser beams received by the beam receiving portion 2. More specifically, the main CPU 101 is configured to detect the position of the touch pen 5 with respect to the projected image 31 by acquiring the scanning positions of the laser beams scanned by the MEMS mirror 109a at the timing of receiving the laser beams reflected by the touch pen 5 and to detect movement of the touch pen 5 on the basis of change in the scanning positions of the laser beams at the timing of receiving the laser beams reflected by the touch pen 5. Further, the main CPU 101 is configured to calculate a moving speed of the touch pen 5 from the receptive results of the laser beams received by the beam receiving portion 2 and to acquire the change in the moving state of the touch pen 5 on the basis of the change in the moving speed of the touch pen 5. More detailedly, the main CPU 101 calculates the moving speed of the touch pen 5 from temporal change in the position of the touch pen 5 corresponding to the image 31 acquired by the position acquisition CPU 110. Then, the main CPU 101 acquires the change in the moving state of the touch pen 5 on the basis of the change in the moving speed of the touch pen 5.

According to the first embodiment, the main CPU 101 is configured to detect an operation (touch operation) performed on the projected image 31 with the touch pen 5 on the basis of the moving state of the touch pen 5. More specifically, the main CPU 101 is configured to detect the operation performed on the projected image 31 with the touch pen 5 on the basis of the change in the moving state of the touch pen 5 acquired from the receptive results of the laser beams received by the beam receiving portion 2. Further, the main CPU 101 is configured to determine that the operation with the touch pen 5 has been performed on a position of the projected image 31 corresponding to a position where the movement of the touch pen 5 has stopped when the movement of the touch pen 5 has stopped on the basis of the change in the moving state of the touch pen 5 acquired from the receptive results of the laser beams received by the beam receiving portion 2. In addition, the main CPU 101 is configured to determine that the touch pen 5 stands still when the position of the touch pen 5 with respect to the projected image 31 remains unchanged in a prescribed range for at least a prescribed time. When the position on the image 31 where the touch pen 5 is detected remains unchanged for at least 0.5 seconds in the range of prescribed pixels, for example, the main CPU 101 determines that the touch pen 5 stands still.

Touch detection processing performed by the main CPU 101 of the projector 100 according to the first embodiment of the present invention on the basis of stopping of the touch pen 5 is now described with reference to FIGS. 3 to 5.

When controlling the projection portion 109 to start projecting the image 31, the main CPU 101 brings the beam receiving portion 2 into a state capable of receiving the laser beams. When determining that the beam receiving portion 2 has detected the laser beams reflected by the touch pen 5 at a step S1, the main CPU 110 acquires coordinates (position information) of the touch pen 5 with respect to the image 31 acquired by the position acquisition CPU 110 on the basis of receptive information in the beam receiving portion 2 at a step S2. Then, the main CPU 101 compares the coordinates (position information) of the touch pen 5 in a current frame of the image 31 with those in a preceding frame at a step S3. When the position of the touch pen 5 moves in a direction approaching the screen 3 as shown at A1 and A2 in FIG. 4, for example, scanning positions (coordinates with respect to the image 31) of the laser beams reflected by the touch. pen 5 move on the screen 3 (on the image 31).

At a step S4, the main CPU 101 determines whether or not the coordinates of the touch pen 5 are moving. Further, the main CPU 101 calculates the moving speed of the touch pen 5. When determining that the touch pen 5 is moving (the moving speed is not zero), the main CPU 101 returns to the step S1. When determining that the touch pen 5 is not moving (the moving speed is zero), on the other hand, the main CPU 101 determines that the image 31 has been touched with the touch pen 5 at a step S5. In other words, the main CPU 5 determines that the image 31 has been touched with the touch pen 5 on a position of the projected image 31 corresponding to a position where the movement of the touch pen 5 has stopped. The main CPU 101 repeats the processing at the steps S1 to S5 during the projection.

In other words, the main CPU 101 determines that an operation (touch operation) with the touch pen 5 has been performed on the position of the projected image 31 corresponding to the position where the touch pen 5 has stopped when detecting that the touch pen 5 has continuously moved in the direction approaching the screen 3 (the projected image 31) and stopped, as shown in FIG. 4. More specifically, the main CPU 101 determines that the touch operation with the touch pen 5 has been performed when detecting that the touch pen 5 has linearly moved to a touch position and stopped. Further, the main CPU 101 determines that the touch operation with the touch pen 5 has been performed when the moving speed of the touch pen 5 has reached zero (corresponding to A3 in FIGS. 4 and 5), as shown in FIG. 5. The direction where the speed is positive indicates that approaching the screen 3. The direction approaching the screen 3 is an example of the "third direction" in the present invention.

According to the first embodiment, as hereinabove described, the projector 100 is provided with the main CPU 110 acquiring the moving state of the touch pen 5 from the receptive results of the laser beams received by the beam receiving portion 2 and detecting the operation (touch operation) performed on the projected image 31 with the touch pen 5 on the basis of the moving state of the touch pen 5 so that the same can detect the operation performed with the touch pen 5 in consideration of moving states of the touch pen 3 before and after the operation therewith, whereby the main CPU 101 can be inhibited from detecting the operation performed with the touch pen 5 on a false position when the reflected laser beams are received while the touch pen 5 approaches an operating position. Thus, the main CPU 101 can precisely detect the operation performed on the projected image 31 with the touch pen 5.

According to the first embodiment, as hereinabove described, the main CPU 101 is configured to detect the operation (touch operation) performed on the projected image 31 with the touch pen 5 on the basis of the change in the moving state of the touch pen 5 acquired from the receptive results of the laser beams received by the beam receiving portion 2. Thus, the main CPU 101 can detect the operation performed on the projected image 31 with the touch pen 5 on the basis of the change in the moving state of the touch pen 5 whose moving speed or direction changes before and after the operation, whereby the same can easily precisely detect the operation performed with the touch pen 5.

According to the first embodiment, as hereinabove described, the main CPU 101 is configured to determine that the operation (touch operation) with the touch pen 5 has been performed on the position of the projected image 31 corresponding to the position where the movement of the touch pen 5 has stopped when the movement of the touch pen 5 has stopped on the basis of the change in the moving state of the touch pen 5 acquired from the receptive results of the laser beams received by the beam receiving portion 2. Thus, the main CPU 101 can detect the operation when the touch pen 5 has stopped on the operating position without detecting the operation in the process of the movement of the touch pen 5 toward the operating position, whereby the same can be easily inhibited from detecting the operation performed with the touch pen 5 on a false position in the process of the movement thereof.

According to the first embodiment, as hereinabove described, the main CPU 101 is configured to calculate a moving speed of the touch pen 5 from the receptive results of the laser beams received by the beam receiving portion 2, to acquire the change in the moving state of the touch pen 5 on the basis of the change in the moving speed of the touch pen 5 and to determine that the operation (touch operation) with the touch pen 5 has been performed on the position of the projected image 31 corresponding to the position where the movement of the touch pen 5 has stopped when the movement of the touch pen 5 has stopped. Thus, the main CPU 101 can easily determine that the movement of the touch pen 5 has stopped on the basis of the moving speed thereof, whereby the same can more easily precisely detect the operation performed with the touch pen 5.

According to the first embodiment, as hereinabove described, the main CPU 101 is configured to determine that the touch pen 5 stands still when the position of the touch pen 5 with respect to the projected image 31 remains unchanged in the prescribed range for at least the prescribed time. Thus, the main CPU 101 can recognize that the touch pen 5 has been stopped for the operation while allowing an error, whereby the same can detect the operation performed with the touch pen 5 to accord with the user's operational intention.

According to the first embodiment, as hereinabove described, the main CPU 101 is configured to detect the position of the touch pen 5 with respect to the projected image 31 by acquiring the scanning positions of the laser beams scanned by the MEMS mirror 109*a* at the timing of receiving the laser beams reflected by the touch pen 5 and to detect the movement of the touch pen 5 on the basis of the change in the scanning positions of the laser beams at the timing of receiving the laser beams reflected by the touch pen 5. Thus, the main CPU 101 can easily detect the movement of the touch pen 5 by easily acquiring the position thereof.

According to the first embodiment, as hereinabove described, the main CPU 101 is configured to determine that the operation (touch operation) with the touch pen 5 has been performed on the position of the projected image 31 corresponding to the position where the touch pen 5 has stopped when detecting that the touch pen 5 has continuously moved in the direction approaching the screen 3 and stopped from the receptive results of the laser beams received by the beam receiving portion 2. Thus, the main CPU 101 determines that the operation with the touch pen 5 has been performed. when the touch pen 5 has continuously moved in the direction approaching the screen 3 toward the operating position and stopped, whereby the same can be easily inhibited from detecting the operation performed with the touch pen 5 on a false position in the process of the movement thereof.

According to the first embodiment, as hereinabove described, the image projection portion 109 includes the projection type image projection portion projecting the image 31 from behind the screen 3. Thus, the main CPU 101 can be inhibited from detecting the operation performed with the touch pen 5 on a false position in the process of the movement thereof to precisely detect the operation performed with the touch pen 5 also in a case where laser beams reflected on positions separating from a screen 3 are easily detected in such a rear projector that a touch pen 5 is arranged on a side of the screen 3 opposite to a side where the laser beams are applied.

(Modification of First Embodiment)

A modification of the first embodiment is now described. While the rear projection type projector 100 is employed in the aforementioned first embodiment as shown in FIG. 1, a front projection type projector 200 is employed in the modification thereof, as shown in FIG. 6.

Figure 6:
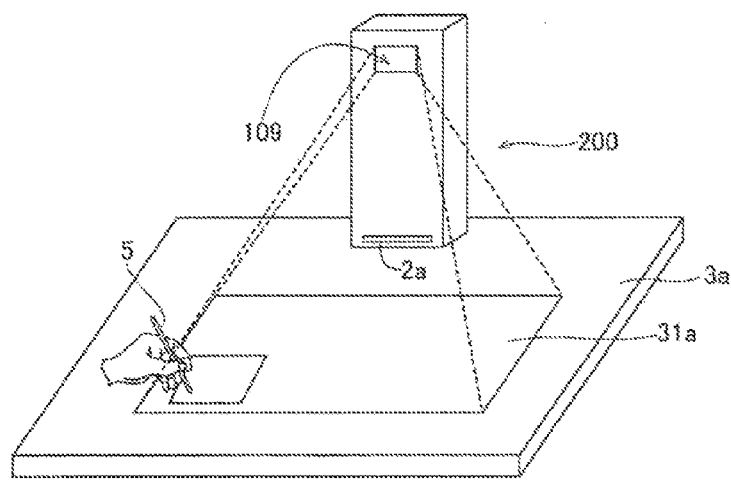
FIG. 6 is a schematic diagram showing a used state of a projector according to a modification of the first embodiment of the present invention.

More specifically, the projector 200 according to the modification of the first embodiment is configured to be used in a state arranged on a table 3a, as shown in FIG. 6. Further, the projector 200 is configured to project an image 31a on the upper surface of a projection area such as the table 3a. The table 3a is an example of the "projection area" in the present invention.

Figure 7:
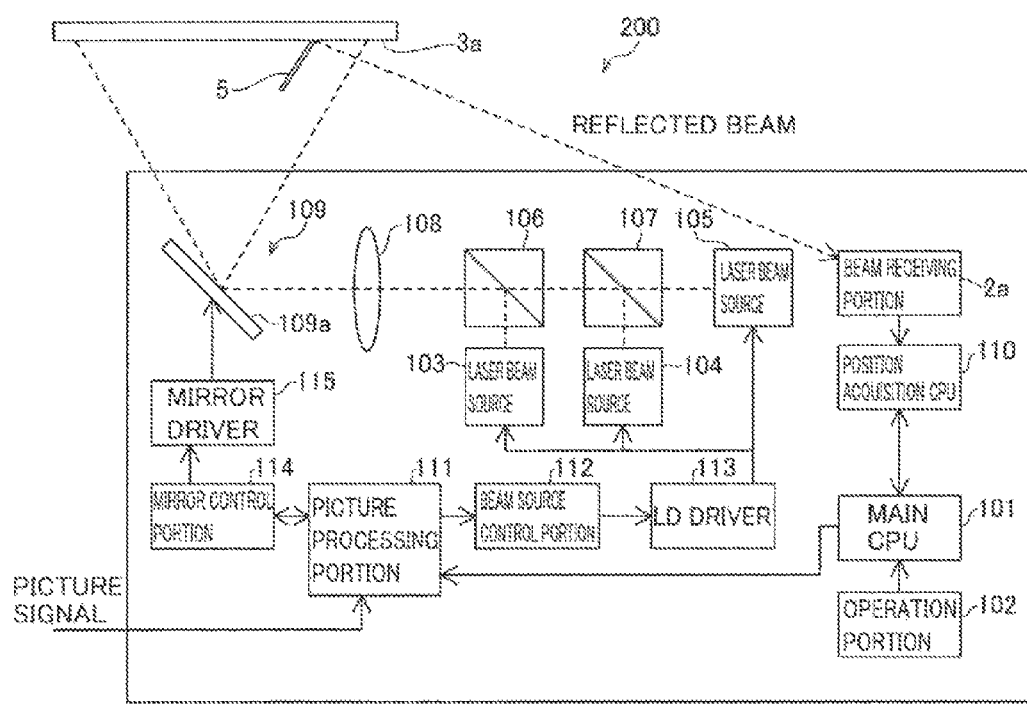
FIG. 7 is a block diagram showing the structure of the projector according to the modification of the first embodiment of the present invention.

The projector 200 includes a main CPU 101, an operation portion 102, three laser beam sources 103, 104 and 105, two polarizing beam splitters 106 and 107, a lens 108, an image projection portion 109, a position acquisition CPU 110, a picture processing portion 111, a beam source control portion 112, an LD (Laser Diode) driver 113, a mirror control portion 114 and a mirror driver 115, as shown in FIG. 7. Further, the projector 200 integrally includes a beam receiving portion 2a. The image projection portion 109 has an MEMS mirror 109a. The main CPU 101 is an example of the "control portion" in the present invention. The laser beam sources 103 to 105 are examples of the "laser beam generation portion" in the present invention, and the MEMS mirror 109a is an example of the "scanning portion" in the present invention.

Figure 8:
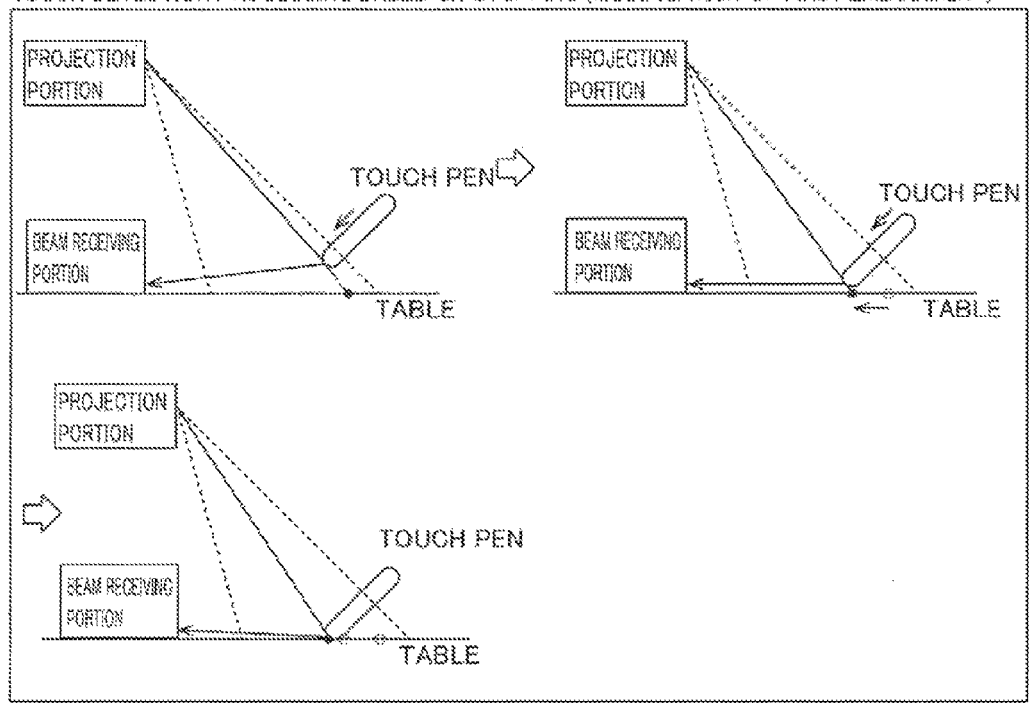
FIG. 8 is a diagram for illustrating movement of a touch pen for operating an image in the projector according to the modification of the first embodiment of the present invention.

According to the modification of the first embodiment, the main CPU 101 is configured to determine that an operation with a touch pen 5 has been performed on a position of the projected image 31a corresponding to a position where movement of the touch pen 5 has stopped when the movement of the touch pen 5 has stopped on the basis of change in a moving state of the touch pen 5 acquired from receptive results of laser beams received by the beam receiving portion 2a, as shown in FIG. 8.

The remaining structure of the modification of the first embodiment is similar to that of the aforementioned first embodiment.

(Second Embodiment)

A second embodiment of the present invention is now described with reference to FIGS. 1, 2 and 9 to 11. According to the second embodiment, a main CPU 101 detects a touch operation on the basis of a moving direction of a touch pen 5, dissimilarly to the first embodiment having the main CPU 101 detecting the touch operation through the stopping of the touch pen 5.

A projector 100 according to the second embodiment of the present invention is constituted of a rear projection type projector similarly to the first embodiment, as shown in FIGS. 1 and 2.

According to the second embodiment, the main CPU 101 is configured to determine that the operation with the touch pen 5 has been performed on a position of a projected image 31 corresponding to a position where the touch pen 5 has started moving in a direction separating from a screen 3 when detecting that the touch pen 5 has moved in a direction approaching the screen 3 (the projected image 31), stopped and started moving in the direction separating from the screen 3 (the projected image 31) on the basis of change in a moving state of the touch pen 5 acquired from receptive results of laser beams received by a beam receiving portion 2. The direction approaching the screen 3 is an example of the "first direction" in the present invention, and the direction separating from the screen 3 is an example of the "second direction" in the present invention.

More specifically, the main CPU 101 is configured to calculate a moving speed of the touch pen 5 from the receptive results of the laser beams received by the beam receiving portion 2, to acquire the change in the moving state of the touch pen 5 on the basis of change in the moving speed of the touch pen 5, and to determine that the operation with the touch pen 5 has been performed on the position of the projected image 31 corresponding to the position where the touch pen 5 has started moving in the direction separating from the screen 3 when detecting that the touch pen 5 has moved in the direction approaching the screen 3, stopped and started moving in the direction separating from the screen 3.

Figure 9:
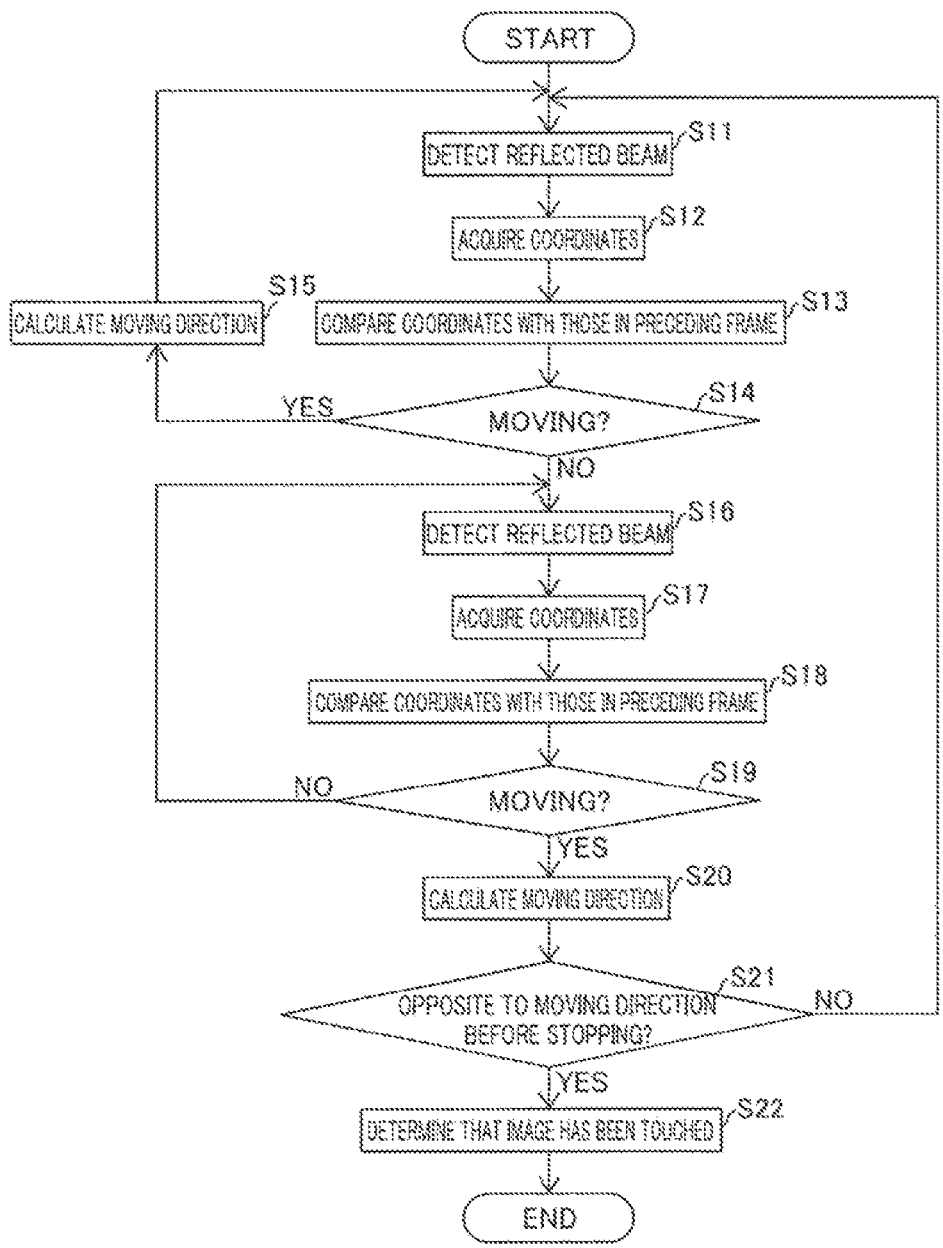
FIG. 9 is a flow chart for illustrating touch detection processing performed by a main CPU of a projector according to a second embodiment of the present invention on the basis of a moving direction of a touch pen.

Touch detection processing performed by the main CPU 101 of the projector 100 according to the second embodiment of the present invention on the basis of the moving direction of the touch pen 5 is now described with reference to FIGS. 9 to 11.

When controlling the projection portion 109 to start projecting the image 31, the main CPU 101 brings the beam receiving portion 2 into a state capable of receiving the laser beams. When determining that the beam receiving portion 2 has detected the laser beams reflected by the touch pen 5 at a step S11, the main CPU 110 acquires coordinates (position information) of the touch pen 5 with respect to the image 31 acquired by the position acquisition CPU 110 on the basis of receptive information in the beam receiving portion 2 at a step S12. Then, the main CPU 101 compares the coordinates (position information) of the touch pen 5 in a current frame of the image 31 with those in a preceding frame at a step S13. When the position of the touch pen 5 moves in the direction approaching the screen 3 as shown at B1 and B2 in FIG. 10, for example, scanning positions (coordinates with respect to the image 31) of the laser beams reflected by the touch pen 5 move on the screen 3 (on the image 31).

At a step S14, the main CPU 101 determines whether or not the coordinates of the touch pen 5 are moving. Further, the main CPU 101 calculates the moving speed of the touch pen 5. When determining that the touch pen 5 is moving (the moving speed is not zero), the main CPU 101 calculates the moving direction of the touch pen 5 at a step S15. More specifically, the main CPU 101 determines whether the touch pen 5 has moved in the direction approaching the screen 3 or in a direction separating from the screen 3. Thereafter the main CPU 101 returns to the step S11. When determining that the touch pen 5 is not moving (the moving speed is zero), on the other hand, the main CPU 101 advances to a step S16.

When determining that the beam receiving portion 2 has detected the laser beams reflected by the touch pen 5 at the step S16, the main CPU 101 acquires the coordinates (position information) of the touch pen 5 with respect to the image 31 acquired by the position acquisition CPU 110 on the basis of the receptive information in the beam receiving portion 2 at a step S17. Then, the main CPU 101 compares the coordinates (position information) of the touch pen 5 in the current frame of the image 31 with those in the preceding frame at a step S18.

At a step S19, the main CPU 101 determines whether or not the coordinates of the touch pen 5 are moving. Further, the main CPU 101 calculates the moving speed of the touch pen 5. When determining that the touch pen 5 is moving (the moving speed is not zero), the main CPU 101 returns to the step S16. When determining that the touch pen 5 is not moving (the moving speed is zero), on the other hand, the main CPU 101 advances to a step S20.

At the step S20, the main CPU 101 calculates the moving direction of the touch pen 5. More specifically, the main CPU 101 determines whether the touch pen 5 has moved in the direction approaching the screen 3 or in the direction separating from the screen 3. At a step S21, the main CPU 101 determines whether or not the moving direction of the touch pen 5 before stopping and the current moving direction are opposite to each other. In other words, the main CPU 101 determines whether or not the touch pen 5 has moved in the direction approaching the screen 3, stopped and started moving in the direction separating from the screen 3. If the moving direction of the touch pen 5 is not opposite to the moving direction before the stopping (if the directions are substantially identical to each other), the main CPU 101 returns to the step S11. If the moving direction of the touch pen 5 is opposite to the moving direction before the stopping, on the other hand, the main CPU 101 determines that a touch operation has been performed on the image 31 with the touch pen 5 at a step S22.

Figure 10:
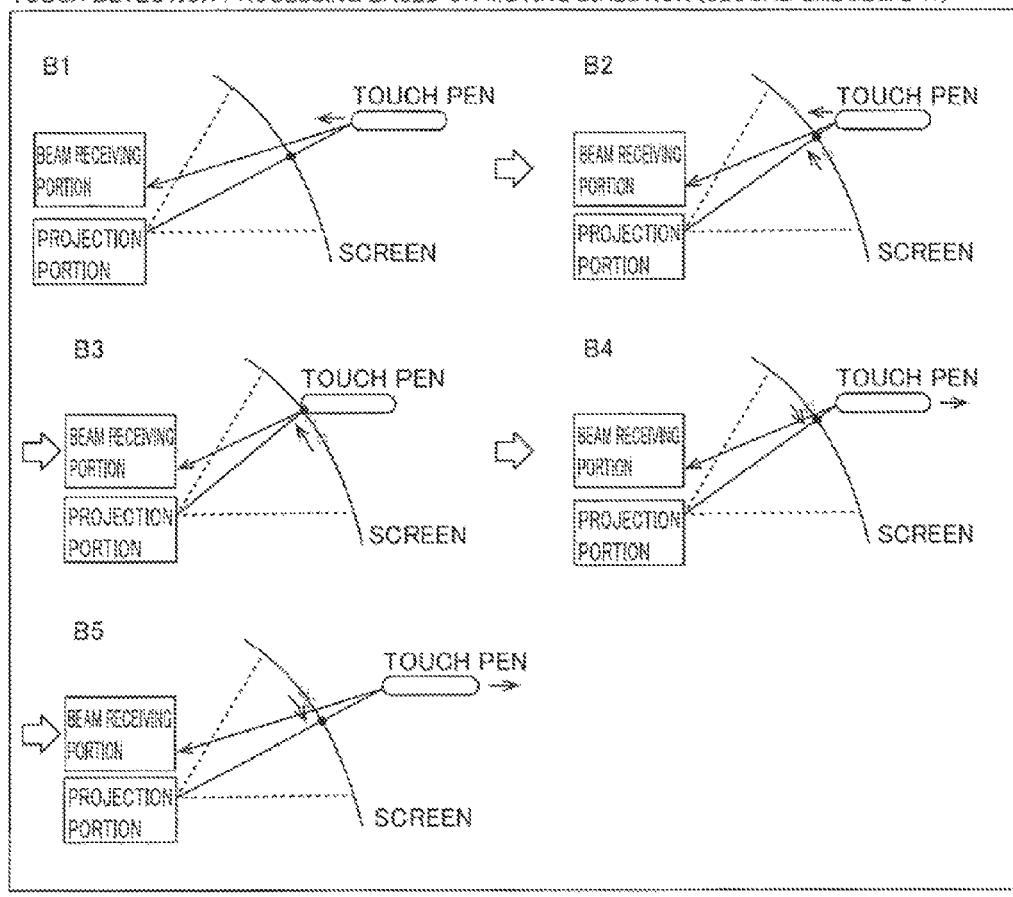
FIG. 10 is a diagram for illustrating movement of the touch pen for operating an image in the projector according to the second embodiment of the present invention.
Figure 11:
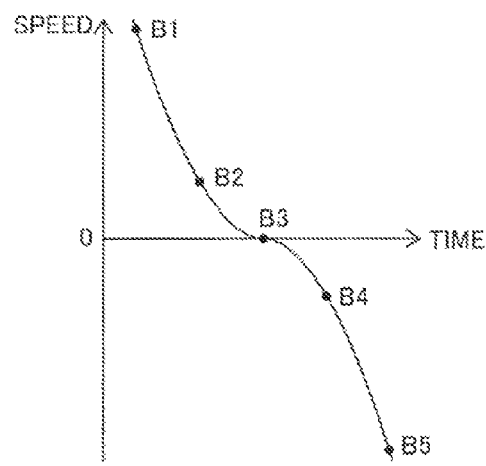
FIG. 11 is a graph showing the relation between a moving speed of the touch pen for operating the image in the projector according to the second embodiment of the present invention and time.
Figure 12:
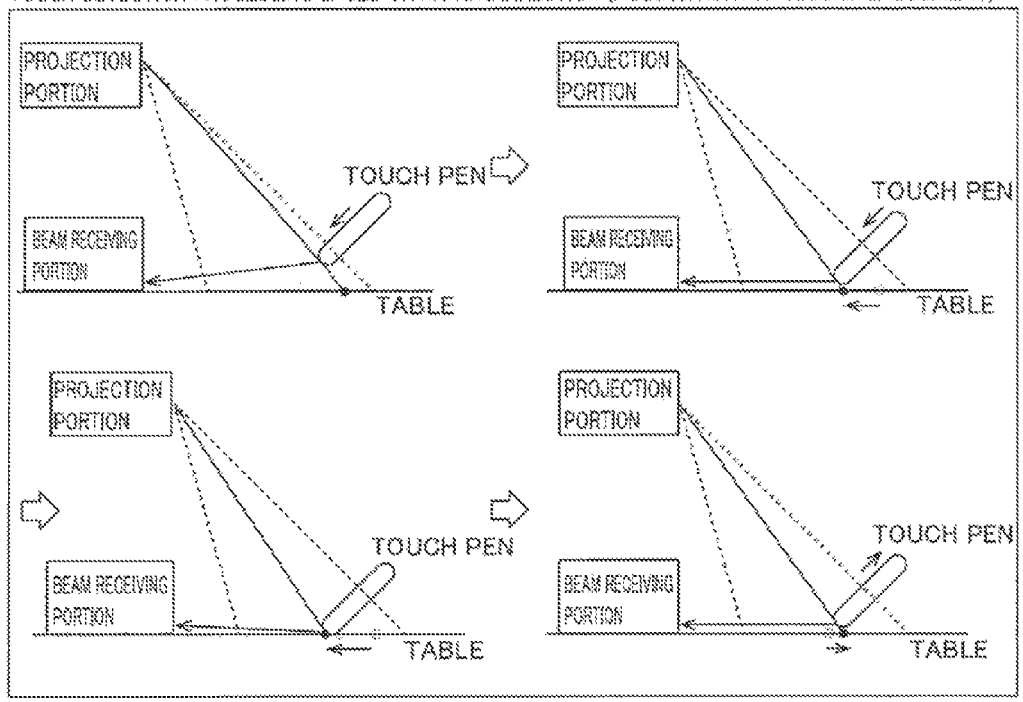
FIG. 12 is a diagram for illustrating movement of a touch pen for operating an image in a projector according to a modification of the projector according to the second embodiment of the present invention.

In other words, the main CPU 101 determines that the operation with the touch pen 5 has been performed on a position of the projected image 31 corresponding to a position (corresponding to B4 in FIG. 10) where the touch pen 5 has started moving in the direction separating from the screen 3 when detecting that the touch pen 5 has moved in the direction approaching the screen 3 as shown at B1 and B2 in FIG. 10, stopped as shown at B3 in FIG. 10 and started moving in the direction separating from the screen 3 as shown at B4 in FIG. 10. To put it differently, the main CPU 101 determines that the touch operation has been performed on the image 31 with the touch pen 5 when the speed of the touch pen 5 has reached a level (negative value) in the direction separating from the screen 3 from a level (positive value) in the direction approaching the screen 3 after temporary stopping, as shown in FIG. 11. The main CPU 101 repeats the processing at the steps S11 to S22 during the projection.

The remaining structure of the second embodiment is similar to that of the aforementioned first embodiment.

Also in the structure accordion to the second embodiment, as hereinabove described, the projector 100 is provided with the main CPU 101 acquiring the moving state of the touch pen 5 from the receptive results of the laser beams received by the beam receiving portion 2 and detecting the operation (touch operation) performed on the projected image 31 with the touch pen 5 on the basis of the moving state of the touch pen 5 similarly to the aforementioned first embodiment, whereby the main CPU 101 can precisely detect the operation performed on the projected image 31 with the touch pen 5.

According to the second embodiment, as hereinabove described, the main CPU 101 is configured to determine that the operation (touch operation) with the touch pen 5 has been performed on the position of the projected image 31 corresponding to the position where the touch pen 5 has started moving in the direction separating from the screen 3 when detecting that the touch pen 5 has moved in the direction approaching the screen 3, stopped and started moving in the direction separating from the screen 3 on the basis of the change in the moving state of the touch pen 5 acquired from the receptive results of the laser beams received by the beam. receiving portion 2. Thus, the main CPU 101 can detect the operation performed on the projected image 31 with the touch pen 5 on the basis of a series of moving states of the touch pen 5 approaching the projected image 31 by moving in the direction approaching the screen 3, stopping and separating from the projected image 31 by moving in the direction separating from the screen 3, whereby the same can detect the operation performed wish the touch pen 5 on a temporarily stopped position when the touch pen 5 has temporarily stopped and started moving to an operating position again in the process of moving toward the operating position, for example. Consequently, the main CPU 101 can more precisely detect the operation performed with the touch pen 5.

According to the second embodiment, as hereinabove described, the main CPU 101 is configured to calculate a moving speed of the touch pen 5 from the receptive results of the laser beams received by the beam receiving portion 2, to acquire the change in the moving state of the touch pen 5 on the basis of the change in the moving speed of the touch pen 5, and to determine that the operation (touch operation) with the touch pen 5 has been performed on the position of the projected image 31 corresponding to the position where the touch pen 5 has started moving in the direction separating from the screen 3 when detecting that the touch pen 5 has moved in the direction approaching the screen 3, stopped and started moving in the direction separating from the screen 3. Thus, the main CPU 101 can easily determine that the touch pen 5 has moved in the direction approaching the screen 3, stopped and started moving in the direction separating from the screen 3 on the basis of the moving speed of the touch pen 5, whereby the same can more easily precisely detect the operation performed with the touch pen 5.

The remaining effects of the second embodiment are similar to those of the aforementioned first embodiment.

(Modification of Second Embodiment)

A modification of the second embodiment is now described. While the rear projection type projector 100 is employed in the aforementioned second embodiment as shown in FIG. 1, a front projection type projector 200 is employed in the modification thereof similarly to the modification of the first embodiment, as shown in FIG. 6.

According to the modification of the second embodiment, a main CPU 101 is configured to calculate a moving speed of a touch pen 5 from receptive results of laser beams received by a beam receiving portion 2*a*, to acquire change in a moving state of the touch pen 5 on the basis of change in the moving speed of the touch pen 5 and to determine that an operation with the touch pen 5 has been performed on a position of a projected image 31*a* corresponding to a position where the touch pen 5 has started moving in a direction separating from a table. 3*a* when detecting that the touch pen 5 has moved in a direction approaching the table 3*a*, stopped and started moving in the direction separating from the table 3*a*.

The remaining structure of the modification of the second embodiment is similar to that of the aforementioned second embodiment.

(Third Embodiment)

A third embodiment of the present invention is now described, with reference to FIGS. 1, 2 and 13 to 15. According to the third embodiment, a main CPU 101 detects a moving state of a touch pen 5 on the basis of a quantity of laser beams received by a beam receiving portion 2, dissimilarly to the first and second embodiments each having the main CPU 101 detecting the moving state of the touch pen 5 on the basis of the moving speed thereof.

A projector 100 according to the third. embodiment of the present invention is constituted of a rear projection type projector as shown in FIGS. 1 and 2, similarly to the first embodiment.

Figure 15:
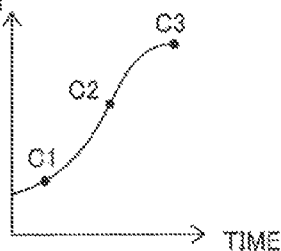
FIG. 15 is a graph showing the relation between the quantity of laser beams received by a beam receiving portion of the projector according to the third embodiment of the present invention and time.

According to the third embodiment, the main CPU 101 is configured to determine that an operation with the touch pen 5 has been performed on a position of a projected image 31 Corresponding to a position where movement of the touch pen 5 has stopped when the movement has stopped on the basis of change in a moving state of the touch pen 5 acquired from receptive results of the laser beams received by the beam receiving portion 2. More specifically, the main CPU 101 is configured to acquire the change in the moving state of the touch pen 5 on the basis of change in the quantity of the laser beams received by the beam receiving portion 2 and to determine that the operation with the touch pen 5 has been performed when the change in the quantity of the received laser beams has stopped in a case where the quantity of the received laser beams has increased and the change in the quantity of the received laser beams has stopped, as shown in FIG. 15.

Further, the main CPU 101 is configured to measure the quantity of laser beams reflected by the touch pen 5 and received by the beam receiving portion 2 every pixel in one frame of the projected image 31. In this case, the main CPU 101 may measure a peak value or an integrated value of the quantity of the received laser beams.

Figure 13:
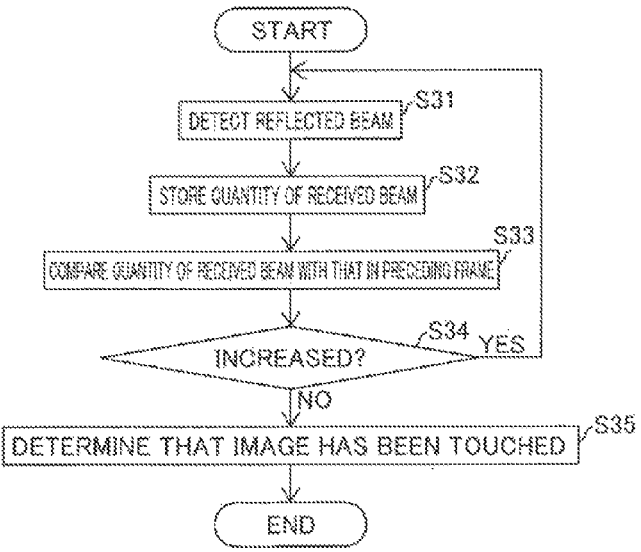
FIG. 13 is a flow chart for illustrating touch detection processing performed by a main CPU of a projector according to a third embodiment of the present invention on the basis of stopping of change in the quantity of received laser beams.
Figure 14:
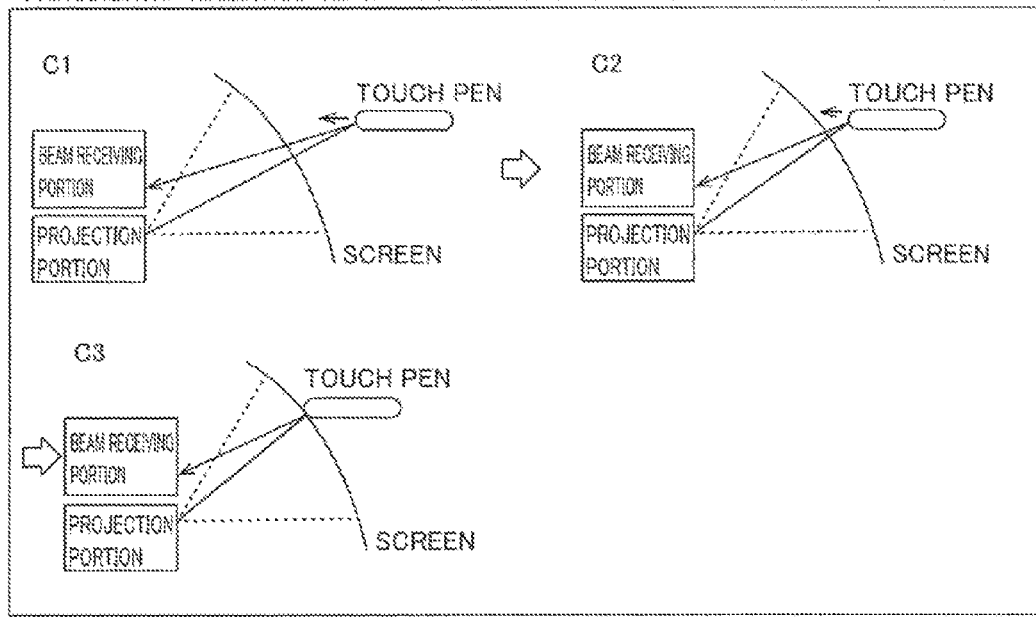
FIG. 14 is a diagram for illustrating movement of a touch pen for operating an image in the projector according to the third embodiment of the present invention.

Touch detection processing performed by the main CPU 101 of the projector 100 according to the third embodiment of the present invention on the basis of stopping of the change in the quantity of the received, laser beams is now described with reference to FIGS. 13 to 15.

When controlling the projection portion 109 to start projecting the image 31, the main CPU 101 brings the beam receiving portion 2 into a state capable of receiving the laser beams. When determining that the beam receiving portion 2 has detected the laser beams reflected by the touch pen 5 at a step 331, the main CPU 101 stores the quantity of the laser beams received by the beam receiving portion 2 at a step S32. At a step S33, the main CPU 101 compares the quantity of the received laser beams in a current frame of the image 31 with that in a preceding frame. When the position of the touch pen 5 moves in a direction approaching a screen 3 as shown at C1 and C2 in FIG. 14, for example, the quantity of the laser beams reflected by the touch pen 5 and received by the beam receiving portion 2 increases.

At a step S34, the main CPU 101 determines whether or not the quantity of the received laser beams in the current frame has increased as compared with the preceding frame. When determining that the quantity of the received laser beams has increased, the main CPU 101 returns to the step 331. When determining that increase in the quantity of the received laser beams has stopped, on the other hand, the main CPU 101 determines that a touch operation has been performed on the image 31 with the touch pen 5 at a step S35. In other words, the main CPU 101 determines that the operation with the touch pen 5 has been performed when the change in the quantity of the received laser beams has stopped in a case where the quantity of the received laser beams has increased and the change in the quantity of the received laser beams has stopped (corresponding to C3 in FIGS. 14 and 15), as shown in FIG. 15. The main CPU 101 repeats the processing at the steps S31 to S35 during the projection.

The remaining structure of the third embodiment is similar to that of the aforementioned first embodiment.

Also in the structure according to the third embodiment, as hereinabove described, the projector 100 is provided with the main CPU 101 acquiring the moving state of the touch pen 5 from the receptive results of the laser beams received by the beam receiving portion 2 and detecting the operation (touch operation) performed on the projected image 31 with the touch pen 5 on the basis of the moving state of the touch pen 5, whereby the main CPU 101 can precisely detect the operation performed on the projected image 31 with the touch pen 5.

According to the third embodiment, as hereinabove described, the main CPU 101 is configured to acquire the change in the moving state of the touch pen 5 on the basis of the change in the quantity of the laser beams received by the beam receiving portion 2 and to determine that the operation (touch operation) with the touch pen 5 has been performed when the change in the quantity of the received laser beams has stopped in the case where the quantity of the received laser beams has increased and the change in the quantity of the received laser beams has stopped. Thus, the main CPU 101 can easily determine that movement of the touch pen 5 has stopped on the basis of that the change in the quantity of the received laser beams has stopped, whereby the same can more easily precisely detect the operation performed with the touch pen 5.

The remaining effects of the third embodiment are similar to those of the aforementioned first embodiment.

(Modification of Third Embodiment)

A modification of the third embodiment is now described. While the rear projection type projector 100 is employed in the aforementioned third embodiment as shown in FIG. 1, a front projection type projector 200 is employed in the modification thereof similarly to the modification of the first embodiment, as shown in FIG. 6.

Figure 16:
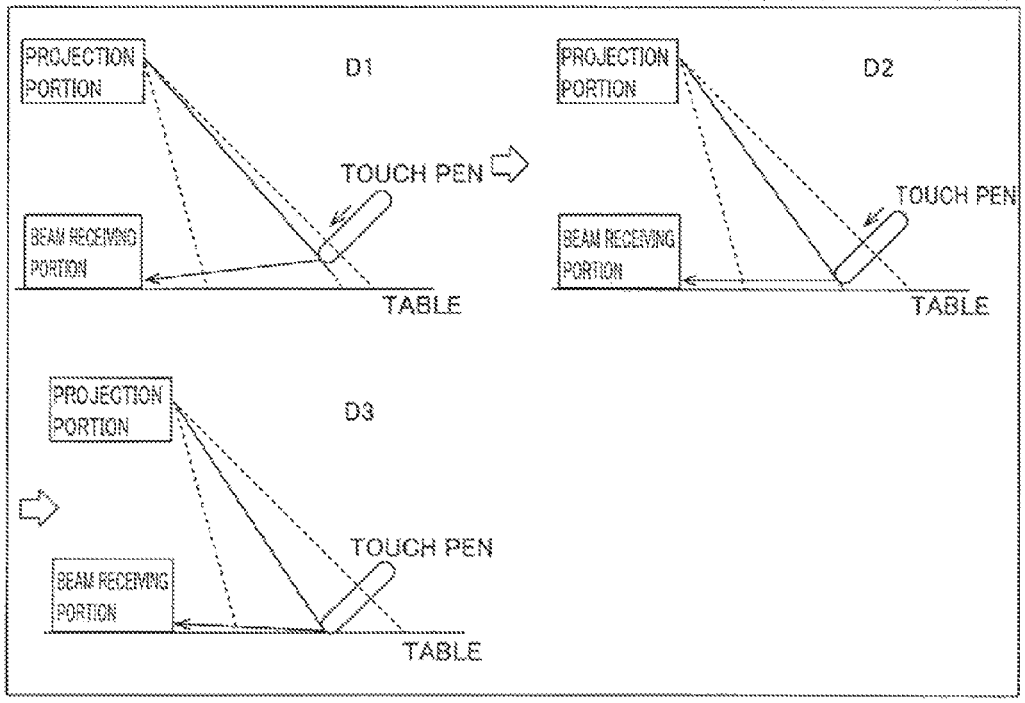
FIG. 16 is a diagram for illustrating movement of a touch pen for operating an image in a projector according to a modification of the third embodiment of the present invention.
Figure 17:
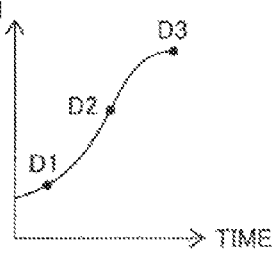
FIG. 17 is a graph showing the relation between the quantity of laser beams received by a beam receiving portion of the projector according to the modification of the third embodiment of the present invention and time.

According to the modification of the third embodiment, a main CPU 101 is configured to acquire change in a moving state of a touch pen 5 on the basis of change in the quantity of laser beams received by a beam receiving portion 2a and to determine that an operation with the touch pen 5 has been performed when the change in the quantity of the received laser beams has stopped in a case where the quantity of the received laser beams has increased and the change in the quantity of the received laser beams has stopped (corresponding to D3 in FIGS. 16 and 17), as shown in FIGS. 16 and 17.

The remaining structure of the modification of the third embodiment is similar to that of the aforementioned third embodiment.

(Fourth Embodiment)

A fourth embodiment of the present invention is now described with reference to FIGS. 1, 2 and 18 to 20. According to the fourth embodiment, a main CPU 101 detects a touch operation on the basis of change in the quantity of laser beams received by a beam receiving portion 2, dissimilarly to the third embodiment having the main CPU 101 detecting the touch operation on the basis of the stopping of the change in the quantity of the laser beams received by the beam receiving portion 2.

A projector 100 according to the fourth embodiment of the present invention is constituted of a rear projection type projector as shown in FIGS. 1 and 2, similarly to the first embodiment.

According to the fourth embodiment, the main CPU 101 is configured to determine that an operation with a touch pen 5 has been performed on a position of a projected image 31 corresponding to a position where the touch pen 5 has started moving in a direction separating from a screen 3 when detecting that the touch pen 5 has moved in a direction approaching the screen 3, stopped and started moving in the direction separating from the screen 3 on the basis of change in a moving state of the touch pen 5 acquired from receptive results of the laser beams received by the beam receiving portion 2.

Figure 20:
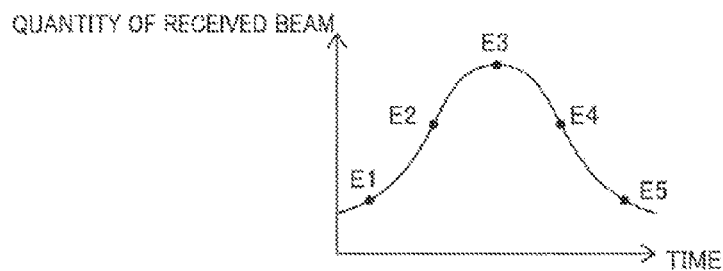
FIG. 20 is graph showing the relation between the quantity of the laser beams received by a beam receiving portion of the projector according to the fourth embodiment of the present invention and time.

More specifically, the main CPU 101 is configured to acquire the change in the moving state of the touch pen 5 on the basis of change in the quantity of the laser beams received by the beam receiving portion 2 and to determine that the operation with the touch pen 5 has been performed when the quantity of the received laser beams has started decreasing in a case where, the quantity of the received laser beams has increased, the change in the quantity of the received laser beams has stopped and the quantity of the received laser beams has started decreasing as shown in FIG. 20.

Figure 18:
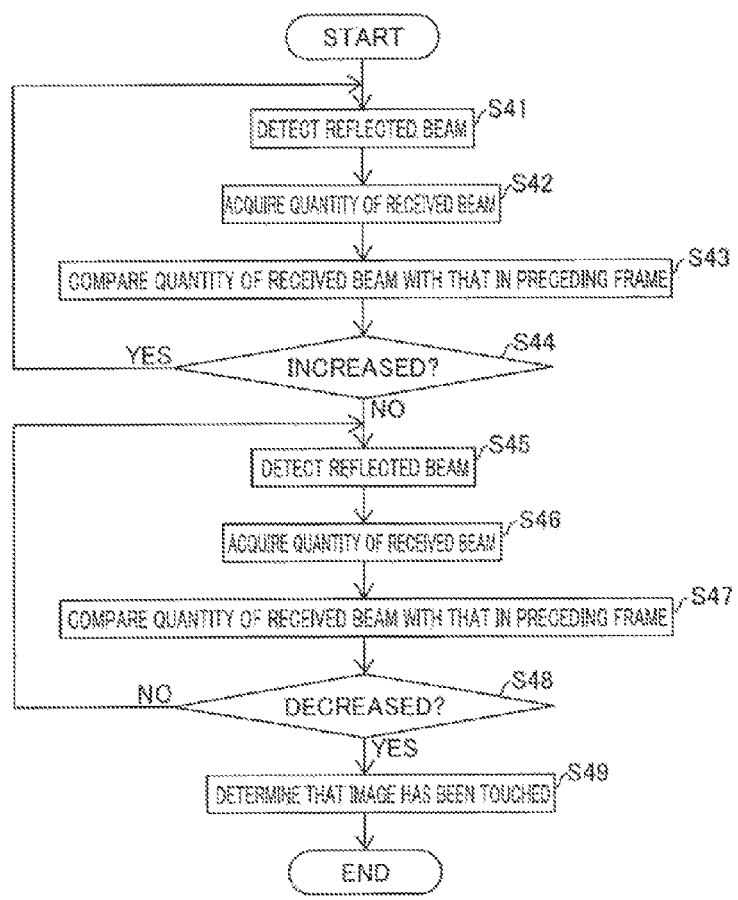
FIG. 18 is a flow chart for illustrating touch detection processing performed by a main CPU of a projector according to a fourth embodiment of the present invention on the basis of change in the quantity of received laser beams.
Figure 19:
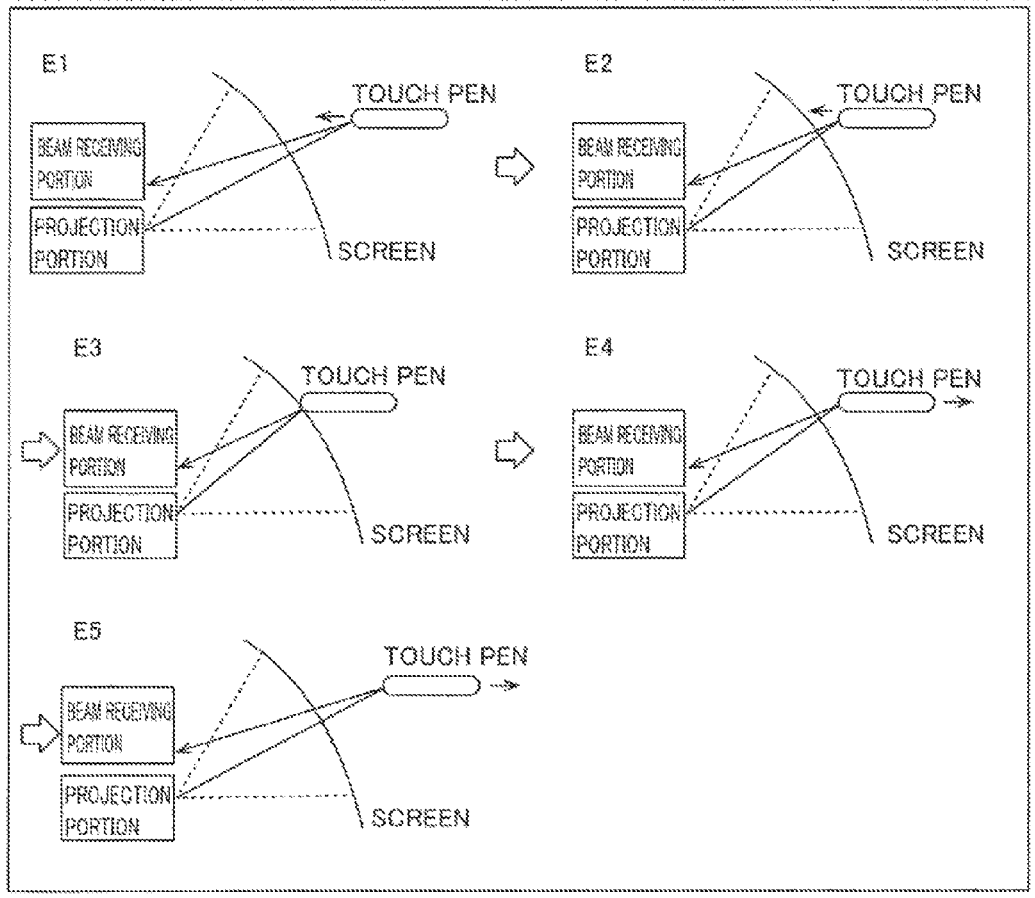
FIG. 19 is a diagram for illustrating movement of a touch pen for operating an image in the projector according to the fourth embodiment of the present invention.

Touch detection processing performed by the main CPU 101 of the projector 100 according to the fourth embodiment of the present invention is now described with reference to FIGS. 18 to 20.

When controlling a projection portion 109 to start projecting the image 31, the main CPU 101 brings the beam receiving portion 2 into a state capable of receiving the laser beams. When determining that the beam receiving portion 2 has detected the laser beams reflected by the touch pen 5 at a step S41, the main CPU 101 stores the quantity of the laser beams received by the beam receiving portion 2 at a step S42. At a step S43, the main CPU 101 compares the quantity of the received, laser beams in a current frame of the image 31 with that in a preceding frame. When the position of the touch pen 5 moves in the direction approach the screen 3 as shown at E1 and E2 in FIG. 19, for example, the quantity of the laser beams reflected by the touch pen 5 and received by the beam receiving portion 2 increases.

At a step S44, the main CPU 101 determines whether or not the quantity of the received laser beams in the current frame has increased as compared with the preceding frame. When determining that the quantity of the received laser beams has increased, the main CPU 101 returns to the step S41. When determining that increase in the quantity of the received laser beams has stopped, on the other hand, the main CPU 101 advances to a step S45.

When determining that the beam receiving portion 2 has detected the laser beams reflected by the touch pen 5 at the step S45, the main CPU 101 stores the quantity of the laser beams received by the beam receiving portion 2 at a step S46. At a step S47, the main CPU 101 compares the quantity of the received laser beams in the current frame of the image 31 with that in the preceding frame.

At a step S48, the main CPU 101 determines whether or not the quantity of the received laser beams has decreased as compared with that in the preceding frame. When determining that the quantity of the received laser beams has not decreased. (the quantity of the received laser beams has remained unchanged), the main CPU 101 returns to the step S45. When determining that the quantity of the received laser beams has decreased, on the other hand, the main CPU 101 determines that the touch operation has been performed on the image 31 with the touch pen 5 at a step S49. In other words, the main CPU 101 determines that the operation with the touch pen 5 has been performed when the quantity of the received laser beams has started decreasing in a case where the quantity of the received laser beams has increased, change in the quantity of the received laser beams has stopped as shown at E3 in FIG. 20 and the quantity of the received laser beams has started decreasing, as shown in FIG. 20. The main CPU 101 repeats the processing at the steps S41 to S49 during the projection.

The remaining structure of the fourth embodiment is similar to that of the aforementioned first embodiment.

Also in the structure according to the fourth embodiment, as hereinabove described, the projector 100 is provided with the main CPU 101 acquiring the moving state of the touch pen 5 from the receptive results of the laser beams received by the beam receiving portion 2 and detecting the operation (touch operation) performed on the projected image 31 with the touch pen 5 on the basis of the moving state thereof similarly to the aforementioned first embodiment, whereby the main CPU 101 can precisely detect the operation performed on the projected image 31 with the touch pen 5.

According to the fourth embodiment, as hereinabove described, the main CPU 101 is configured to acquire the change in the moving state of the touch pen 5 on the basis of change in the quantity of the laser beams received by the beam receiving portion 2 and to determine that the operation with the touch pen 5 has been performed when the quantity of the received laser beams has started decreasing in the case where the quantity of the received laser beams has increased, the change in the quantity of the received laser beams has stopped and the quantity of the received laser beams has started decreasing. Thus, the main CPU 101 can easily determine that the touch pen 5 has moved in the direction approaching the screen 3, stopped and started moving in the direction separating from the screen 3 on the basis of that the quantity of the received laser beams has increased, the change in the quantity of the received laser beams has stopped and the quantity of the received laser beams has started decreasing, whereby the same can more easily precisely detect the operation performed with the touch pen 5.

The remaining effects of the fourth embodiment are similar to those of the aforementioned first embodiment.

(Modification of Fourth Embodiment)

A modification of the fourth embodiment is now described. While the rear projection type projector 100 is employed in the aforementioned fourth embodiment as shown in FIG. 1, a front projection type projector 200 is employed in the modification thereof similarly to the modification of the first embodiment, as shown in FIG. 6.

Figure 21:
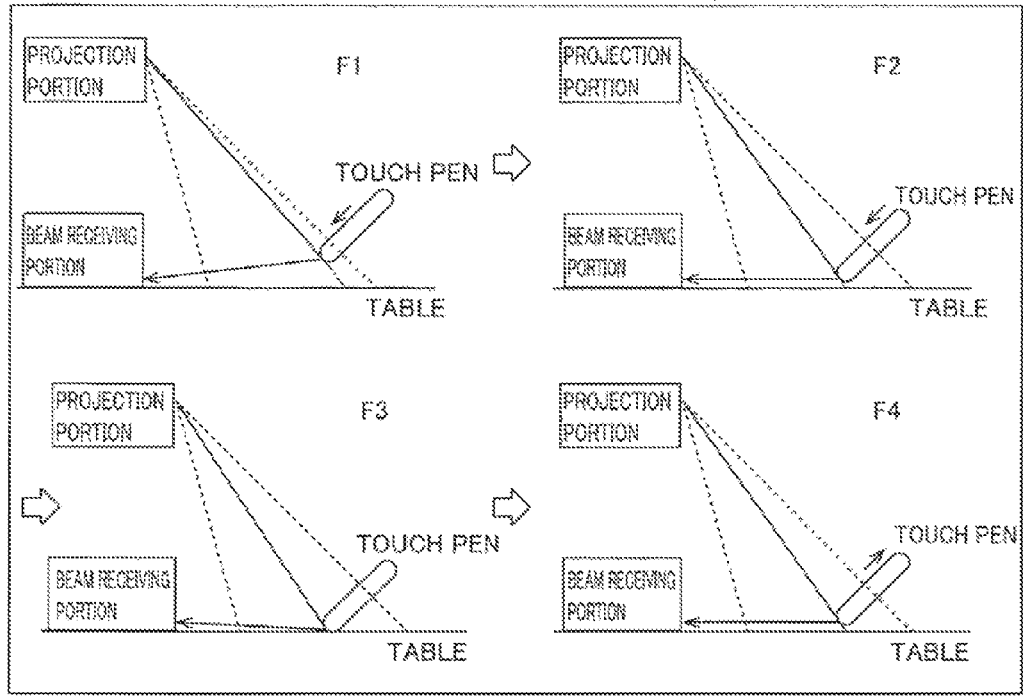
FIG. 21 is a diagram for illustrating movement of a touch pen for operating an image in a projector according to a modification of the fourth embodiment of the present invention and time.
Figure 22:
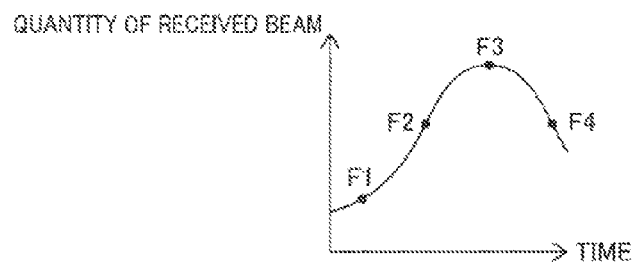
FIG. 22 is a graph showing the relation between the quantity of laser beams received by a beam receiving portion of the projector according to the modification of the fourth embodiment of the present invention and time.

According to the modification of the fourth embodiment, a main CPU 101 is configured to acquire change in a moving state of a touch pen 5 on the basis of change in the quantity of laser beams received by a beam receiving portion 2 and to determine that an operation with the touch pen 5 has been performed when the quantity of the received laser beams has started decreasing in a case where the quantity of the received laser beams has increased (corresponding to F1 and F2 in FIGS. 21 and 22), the change in the quantity of the received laser beams has stopped (corresponding to F3 in FIGS. 21 and 22) and the quantity of the received laser beams has started decreasing (corresponding to F4 in FIGS. 21 and 22), as shown in FIGS. 21 and 22.

The remaining structure of the modification of the fourth embodiment is similar to that of the aforementioned fourth embodiment.

Although the present invention has been described and illustrated in detail, it is clearly understood that the same is by way of illustration and example only and is not to be taken by way of limitation, the spirit and scope of the present invention being limited only by the terms of the appended claims.

For example, while the rear projection type projector is employed in each of the aforementioned first to fourth embodiments, the rear projection type projector may include a projector such as a rear projection television according to the present invention.

While the image projection portion projects the image on the table as the projection area in each of the modifications of the aforementioned first to fourth embodiments, the present invention is not restricted to this. According to the present invention, the image projection portion may alternatively project the image on a projection area such as a screen, or may project the image on at least two projection areas such as a table and a screen while dividing laser beams.

While the screen is in the form of a curved surface in each of the aforementioned first to fourth embodiments, the present invention is not restricted to this. According to the present invention, the screen may alternatively be in the form of a planar surface, or may have a stereoscopic shape (such as a spherical shape, for example).

While the beam receiving portion is provided independently of the projector body including the image projecting portion in each of the aforementioned first to fourth embodiments, the present invention is not restricted to this. According to the present invention, the projector may alternatively integrally include the beam receiving portion and the image projecting portion.

While the touch pen is employed as the detection object in each of the aforementioned first to fourth embodiments, the present invention is not restricted to this. According to the present invention, a finger or a hand may alternatively be employed as the detection object, so far as the same can reflect laser beams.

While the laser beam source applies the red, green and blue laser beams for projecting the image so that the main CPU acquires the position (coordinates) of the touch pen as the detection object in each of the aforementioned first to fourth embodiments, the present invention is not restricted to this. According to the present invention, the main CPU may alternatively acquire the position (coordinates) of The detection object with a laser beam (invisible laser beam) such as an infrared laser beam, dedicated to detection, not contributing to image projection.

While the processing of the control portion (main CPU) according to the present invention is described with reference to the flow chart of a flow-driven type successively performing processing along the processing flow in each of the aforementioned first to fourth embodiments for the convenience of illustration, the present invention is not restricted to this. According to the present invention, the control portion may alternatively perform event-driven processing every event. In this case, the control portion may perform complete event-driven processing, or a combination of event-driven processing and flow-driven processing.

What is claimed is:

1. A projector comprising:
   a laser beam generation portion outputting a laser beam;
   an image projection portion including a scanning portion scanning the laser beam and projecting an image on a projection area;
   a beam receiving portion receiving the laser beam reflected by a detection object; and
   a control portion acquiring a moving of the detection object from a receptive result of the laser beam received by the beam receiving portion and detecting an operation performed on the projected image with the detection object on the basis of the moving of the detection object, wherein
   the control portion detects the operation performed on a projected image by the detection object on the basis that the detection object has moved in a first direction approaching the projected image at least in a direction perpendicular to the projected image and stopped.

2. The projector according to claim 1, wherein
the control portion detects the operation performed on the projected image with the detection object on the basis of change in the moving of the detection object acquired from the receptive result of the laser beam received by the beam receiving portion.

3. The projector according to claim 2, wherein
the control portion determines that the operation by the detection object has been performed on a position of the projected image corresponding to a position where movement of the detection object has stopped when determining that the movement of the detection object has stopped on the basis of the change in the moving of the detection object acquired from the receptive result of the laser beam received by the beam receiving portion.

4. The projector according to claim 2, wherein
the control portion calculates a moving speed of the detection object from the receptive result of the laser beam received by the beam receiving portion, to acquire the change in the moving of the detection object on the basis of change in the moving speed of the detection object, and to determine that the operation by the detection object has been performed on a position of the projected image corresponding to a position where movement of the detection object has stopped when the movement of the detection object has stopped.

5. The projector according to claim 3, wherein
the control portion determines that the detection object stands still when the position of the detection object with respect to the projected image remains unchanged in a prescribed range for at least a prescribed time.

6. The projector according to claim 2, wherein
the control portion acquires a scanning position of the laser beam scanned by the scanning portion at the time when receiving the laser beam reflected by the detection object, to detect a position of the detection object with respect to the projected image and to detect movement of the detection object on the basis of change in the scanning position of the laser beam at the timing of receiving the laser beam reflected by the detection object.

7. The projector according to claim 2, wherein
the control portion acquires the change in the moving of the detection object on the basis of change in the quantity of the laser beam received by the beam receiving portion and to determine that the operation by the detection object has been performed when the change in the quantity of the received laser beam has stopped in a case where the quantity of the received laser beam has increased and the change in the quantity of the received laser beam has stopped.

8. The projector according to claim 2, wherein
the control portion determines that the operation by the detection object has been performed on a position of the projected image corresponding to a position where the detection object has started moving in a second direction when detecting that the detection object has moved in a first direction, stopped and started moving in the second direction opposite to the first direction on the basis of the change in the moving of the detection object acquired from the receptive result of the laser beam received by the beam receiving portion.

9. The projector according to claim 2, wherein
the control portion calculates a moving speed of the detection object from the receptive result of the laser beam received by the beam receiving portion, to acquire the change in the moving of the detection object on the basis of change in the moving speed of the detection object, and to determine that the operation by the detection object has been performed on a position of the projected image corresponding to a position where the detection object has started moving in a second direction when detecting that the detection object has moved in a first direction, stopped and started moving in the second direction opposite to the first direction.

10. The projector according to claim 8, wherein
the first direction is a direction approaching the projected image, and
the second direction is a direction separating from the projected image.

11. The projector according to claim 2, wherein
the control portion acquires the change in the moving of the detection object on the basis of change in the quantity of the laser beam received by the beam receiving portion and to determine that the operation by the detection object has been performed when the quantity of the received laser beam has started decreasing in a case where the quantity of the received laser beam has increased, the change in the quantity of the received laser beam has stopped and the quantity of the received laser beam has started decreasing.

12. The projector according to claim 1, wherein
the control portion determines that the operation by the detection object has been performed on a position of the projected image corresponding to a position where the detection object has stopped when detecting that the detection object has continuously moved in a first direction and stopped from the receptive result of the laser beam received by the beam receiving portion.

13. The projector according to claim 1, wherein
the image projection portion includes a rear projection type image projection portion projecting the image from behind the projection area.

14. The projector according to claim 1, wherein
the control portion detects a touch operation performed on the projected image with the detection object on the basis of the moving of the detection object.

15. A rear projector comprising:
a laser beam generation portion outputting a laser beam;
an image projection portion including a scanning portion scanning the laser beam and projecting an image from behind a projection area;
a beam receiving portion receiving the laser beam reflected by a detection object; and
a control portion acquiring a moving of the detection object from a receptive result of the laser beam received by the beam receiving portion and detecting an operation performed on the projected image with the detection object on the basis of the moving of the detection object, wherein
the control portion detects the operation performed on a projected image by the detection object on the basis that the detection object has moved in a first direction approaching the projected image at least in a direction perpendicular to the projected image and stopped.

16. The rear projector according to claim 15, wherein
the control portion detects the operation performed on the projected image with the detection object on the basis of change in the moving of the detection object acquired from the receptive result of the laser beam received by the beam receiving portion.

17. The rear projector according to claim 16, wherein
the control portion determines that the operation by the detection object has been performed on a position of the projected image corresponding to a position where movement of the detection object has stopped when determining that the movement of the detection object has stopped on the basis of the change in the moving of the detection object acquired from the receptive result of the laser beam received by the beam receiving portion.

18. The rear projector according to claim 16, wherein
the control portion calculates a moving speed of the detection object from the receptive result of the laser beam received by the beam receiving portion, to acquire the change in the moving of the detection object on the basis of change in the moving speed of the detection object, and to determine that the operation by the detection object has been performed on a position of the projected image corresponding to a position where movement of the detection object has stopped when the movement of the detection object has stopped.

19. The rear projector according to claim 16, wherein
the control portion acquires the change in the moving of the detection object on the basis of change in the quantity of the laser beam received by the beam receiving portion and to determine that the operation by the detection object has been performed when the change in the quantity of the received laser beam has stopped in a case where the quantity of the received laser beam has increased and the change in the quantity of the received laser beam has stopped.

* * * * *